United States Patent Office 3,450,763
Patented June 17, 1969

3,450,763
α-(N-ALKYL - N - 3,3 - DIPHENYL PROPYLAMINO-METHYL)-INDANMETHANOLS AND THE SALTS THEREOF
Albert Hofmann and Franz Troxler, Bottmingen, Switzerland, assignors to Sandoz Ltd. (also known as Sandoz A.G.), Basel, Switzerland
No Drawing. Filed Nov. 30, 1966, Ser. No. 597,883
Claims priority, application Switzerland, Dec. 8, 1965, 16,918/65
Int. Cl. C07c 85/12, 87/28
U.S. Cl. 260—570
3 Claims The present invention relates to new indan compounds and a process for their production.

The present invention provides indan compounds of Formula I,

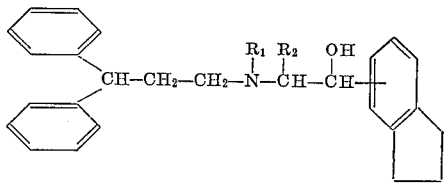

I in which $R_1$ signifies a hydrogen atom or an alkyl radical having from 1 to 4 carbon atoms inclusive, and
$R_2$ signifies a hydrogen atom or a methyl radical, and their acid addition salts.

The present invention further provides a process for the production of compounds I and their acid addition salts, characterized in that an amide of Formula II,

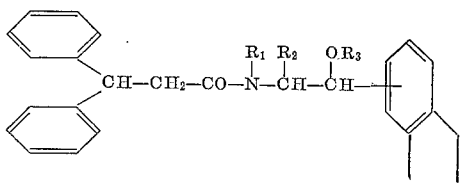

II in which $R_1$ and $R_2$ have the above significance, and
$R_3$ signifies a hydrogen atom or the 3,3-diphenylpropionyl radical, is reduced with lithium aluminium hydride in an organic solvent which is inert under the reaction conditions, and when an acid addition salt is required, the resulting compound of Formula I is reacted with an inorganic or organic acid.

The amides of Formula II, e.g. 5-[O,N-bis-(3,3-diphenylpropionyl)-2-amino-1-hydroxyethyl]indan or 5-[2-(N - 3,3 - diphenylpropinonylamino) - 1 - hydroxyethyl] indan, are also new and may be obtained in that an amine of Formula III,

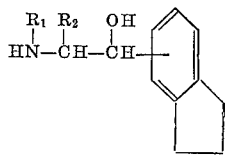

III in which $R_1$ and $R_2$ have the above significance, is acylated with 3,3-diphenylpropionyl chloride, bromide or azide in the presence of an acid binding agent, or with a lower alkyl ester of 3,3-diphenylpropionic acid. This acylation is effected, for example, in that an amine III is reacted with 1 to 2 equivalents of 3,3-diphenylpropionyl chloride, bromide or azide in the presence of 1 to 2 equivalents of an acid binding agent in an organic solvent which is inert under the reaction conditions, e.g. ether, benzene, toluene and anisole, at a temperature between 40 and 100° C. for 1 to 20 hours. Inorganic bases, e.g. potassium carbonate, tertiary organic bases, e.g. triethylamine and diethylamine, or an excess (1 to 2 equivalents) of the amine III used may, for example, be used as acid binding agent.

Alternatively the amine III is heated to 100–150° C. for 1 to 2 hours with 1.0 to 1.2 equivalents of a lower alkyl ester of 3,3-diphenylpropionic acid, whereby in most cases the material melts homogeneously; otherwise the heating is effected in the presence of an organic solvent which is inert under the reaction conditions, e.g. dioxane.

Working up is effected by shaking out the reaction mixture, for example, between an aqueous tartaric acid or hydrochloric acid solution and a water immiscible organic solvent, e.g. benzene and ethyl acetate, and the organic layer is optionally extracted with dilute sodium hydroxide; the organic phase is subsequently dried, e.g. over magnesium sulphate, and concentrated by evaporation.

The above acylation of an amine of Formula III may yield a mixture of the corresponding mono- and diacyl compounds (Formula II, $R_3$=H or 3,3-diphenylpropionyl), depending on the type and amount of acylating agent used and the reaction conditions; this mixture may readily be separated into its components by chromatography. However, as both intermediates yield the same final product during reduction as a result of the splitting of a 3,3-diphenylpropionyloxy radical which may be present, it is not necessary to effect a separation and the crude mixture may be worked up further as such.

In accordance with the invention the reduction of the amide of Formula II is effected with lithium aluminium hydride in an organic solvent which is inert under the reaction conditions, preferably in boiling dioxane and has a duration of 2–4 hours. Working up is effected in that methanol is first added to the cooled reaction mixture and then a saturated aqueous sodium sulphate solution is added, the resulting precipitate is filtered off, the filtrate is concentrated by evaporation and the residue is subsequently shaken out between water and a water immiscible organic solvent, e.g. chloroform and ethyl acetate. The crude product obtained by evaporation of the dried organic phase is purified by chromatography and/or crystallization and is optionally converted into the corresponding salt by reacting with an acid.

The compounds of the invention are colourless crystalline substances or oils which are practically insoluble in water, but fairly or readily soluble in many organic solvents. With inorganic and organic acids they form stable salts, which are usually crystalline and fairly or readily soluble in water. The production of these salts also forms part of the present invention. Examples of acids for acid addition salt formation are: hydrochloric, hydrobromic, sulphuric, nitric, maleic, malonic, succinic and p-toluenesulphonic acid.

The indan compounds of Formula I have hitherto not been described in the literature. They are characterized by valuable pharmacodynamic effects on the circulatory system, exhibiting a pronounced coronary dilatory effect. Their toxicity, however, is relatively low. The new compounds are therefore indicated for use in therapy, especially in the long treatment of angina pectoris and stenocardiac illnesses. A suitable average daily dose is 20–200 mg.

The compounds of the invention or their water-soluble, physiologically tolerated acid addition salts may be used as pharmaceuticals on their own or in the form of suitable medicinal preparations, e.g. tablets, dragées, injectable solutions and suppositories, for administration, e.g. enterally or parenterally. Aside from the usual inorganic and organic, physiologically acceptable adjuvants, e.g. lactose, starch, talc, stearic acid, water, alcohols, glycerin, natural or hardened fats, oils and waxes, the preparations may also contain suitable preserving, stabilizing and wetting agents, solubilizers, sweetening and colouring substances and flavourings.

The compounds of Formula III used as starting materials may be obtained as follows:

Side chain in the 5-position of the indan structure

Indan is acylated with chloroacetyl chloride or 2-chloropropionyl chloride in the presence of a suitable acid catalyst (e.g. anhydrous aluminium chloride), the resulting 5-chloroacetyl-indan or 5-(2-chloropropionyl) indan is condensed in the presence of an acid binding agent with an amine of Formula IV,

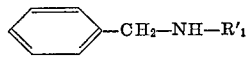    IV in which $R'_1$ signifies the benzyl radical, or has the significance of $R_1$ indicated above, and the resulting amino-ketone is finally hydrogenated over a suitable palladium catalyst, whereby splitting of the benzyl radical or radicals and reduction of the carbonyl radical to the hydroxyl radical occur simultaneously.

Side chain in the 4-position of the indan structure

The hitherto known 4-cyano-indan is converted to 4-acetyl- or 4-propionyl-indan by reacting with a methyl or ethyl magnesium halide, and selective bromination is subsequently effected on the acyl radical, e.g. with copper-(II)-bromide in dioxane. The resulting 4-bromoacetyl-indan or 4-(2-bromopropionyl)indan is also reacted with an amine of Formula IV and the amino-ketone is finally reduced as described above.

In the following non-limitative examples all temperatures are indicated in degrees centigrade and are uncorrected.

EXAMPLE 1.—5-[2-(N-3,3-diphenylpropyl-N-isopropylamino)-1-hydroxyethyl]indan

A solution of 14.2 g. of 3,3-diphenylpropionyl chloride in 30 ml. of absolute tetrahydrofuran is added to 11.63 g. of 5-(1-hydroxy-2-isopropylaminoethyl)indan, 4.3 ml. of absolute pyridine and 75 ml. of absolute benzene and the mixture is heated to the boil for 15 hours. Extraction is effected four times with a 1 N aqueous tartaric acid solution and subsequently twice with a 1 N aqueous sodium hydroxide solution, the organic phase is dried over magnesium sulphate and the solvent evaporated. 15.5 g. of a neutral oil are obtained as residue and are dissolved in 150 ml. of dioxane and then added dropwise whilst stirring to a boiling solution of 6.9 g. of lithium aluminium hydride in 100 ml. of absolute dioxane. After boiling for 2 hours 70 ml. of methanol and then 80 ml. of a saturated aqueous sodium sulphate solution are added to the reaction mixture whilst cooling with ice, filtration is effected, the filtrate is concentrated by evaporation and the residue extracted between chloroform and water. The chloroform phase is separated, dried over magnesium sulphate, reduced in volume and subsequently chromatographed with chloroform on 500 g. of aluminium oxide. The hydrochloride of the oily 5-[2-(N-3,3-diphenylpropyl-N-isopropylamino) - 1 - hydroxyethyl]indan crystallizes from ethanol/ether and has a melting point of 178–180°.

The 5-(1-hydroxy-2-isopropylaminoethyl)indan used as starting material is obtained by reacting 5-chloroacetyl-indan with N-benzyl-isopropylamine and subsequently reducing the resulting 5 - (benzylisopropylamino) - acetyl-indan (oily) with hydrogen in the presence of a palladium catalyst (5% on aluminium oxide). Melting point 94–96°.

EXAMPLE 2.—5-[2-(N-3,3-DIPHENYLPROPYL-AMINO)-1-HYDROXYETHYL]INDAN

A solution of 3.19 g. of 5-[O,N-bis-(3,3-diphenylpropionyl)-2-amino-1-hydroxyethyl]indan in 60 ml. of absolute dioxane is added dropwise whilst stirring to a boiling solution of 2.1 g. of lithium aluminium hydride in 50 ml. of absolute dioxane and the mixture is heated to the boil for 2½ hours. 30 ml. of methanol and then 30 ml. of a saturated aqueous sodium sulphate solution are added whilst cooling with ice, filtration is effected, the filtrate is concentrated by evaporation and the residue extracted between ethyl acetate and water. The organic phase is dried over magnesium sulphate, the solvent evaporated and the residue chromatographed with chloroform on a 50-fold quantity of silica gel. 5-[2-(N-3,3-dihpenylpropylamino)-1-hydroxyethyl]indan is eluted with chloroform and 10% of methanol and is subsequently crystallized from ether. Prisms have a melting point of 93–95°.

The starting material may be produced as follows:

Reaction of 5-chloroacetyl-indan with dibenzylamine yields 5-dibenzylaminoacetyl-indan (melting point 81–83°), which is subsequently reduced with hydrogen in the presence of a palladium catalyst (5% on aluminium oxide) to 5-(2-amino-1-hydroxyethyl)indan; melting point 62–64°.

A solution of 8.8 g. of 3,3-diphenylpropionyl chloride in 40 ml. of absolute toluene is added dropwise at room temperature to a solution of 6.39 g. of 5-(2-amino-1-hydroxyethyl)indan in 40 ml. of absolute toluene and 2.9 ml. of absolute pyridine. The reaction mixture is heated to 40° for 3 hours and subsequently to the boil for 1½ hours, dilution is subsequently effected with ethyl acetate and shaking out is effected thrice with 75 ml. of 1 N aqueous tartaric acid solution. The organic phase is separated, dried over magnesium sulphate and concentrated by evaporation. The residue is chromatographed on 550 g. of silica gel with chloroform and 0.5% of methanol, whereby two compounds are obtained, namely 5-[2-(N-3,3-diphenylpropionylamino) - 1 - hydroxyethyl] indan, which crystallizes from ether/petroleum ether in druses having a melting point of 111–113°, and 5-[O,N-bis-(3,3-diphenylpropionyl)-2-amino - 1 - hydroxyethyl] indan, which crystallizes from ether/petroleum ether in needles have a melting point of 108–109°.

EXAMPLE 3.—5-[2-(N-3,3-DIPHENYLPROPYL-AMINO)-1-HYDROXYETHYL]INDAN

A solution of 2.43 g. of 5-[2-(N-3,3-diphenylpropionyl-amino)-1-hydroxyethyl]indan in 45 ml. of absolute dioxane is added dropwise whilst stirring to a boiling solution of 1.25 g. of lithium aluminium hydride in 30 ml. of absolute dioxane and the mixture is heated to the boil for 2½ hours. 30 ml. of methanol and then 30 ml. of saturated aqueous sodium sulphate solution are added whilst cooling with ice, filtration is effected, the filtrate is concentrated by evaporation and the residue extracted between ethyl acetate and water. The organic phase is dried over magnesium sulphate, the solvent is evaporated and the residue chromatographed on a 50-fold quantity of silica gel with chloroform. 5-[2-(N-3,3-diphenylpropyl-amino)-1-hydroxyethyl]indan is eluted with chloroform and 10% of methanol and is subsequently crystallized from ether. Prisms have a melting point of 93–95°.

The production of the starting material has already been described in Example 2.

Example of a galenic preparation: tablets

G.

| | |
|---|---|
| 5-[2-(N - 3,3 - diphenylpropyl - N - isopropyl-amino)-1-hydroxyethyl]indan hydrochloride (compound of Example 1) | * 0.0544 |
| Stearic acid | 0.0020 |
| Polyvinyl pyrrolidone | 0.0050 |
| Talcum | 0.0050 |
| Maize starch | 0.010 |
| Lactose | 0.0836 |
| For a tablet of | 0.160 |

*Corresponds to 0.050 g. of the free base.

What is claimed is:
1. A compound selected from the group consisting of a compound of formula:

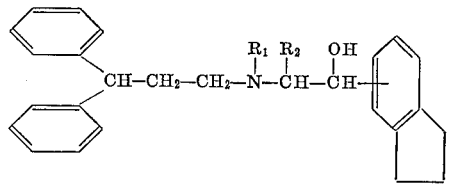

in which $R_1$ is hydrogen or alkyl of 1 to 4 carbon atoms and $R_2$ is hydrogen or methyl, and the pharmaceutically acceptable acid addition salts thereof.

2. A compound according to claim 1, in which the compound is 5 - [2-(N-3,3-diphenylpropyl-N-isopropyl-amino)-1-hydroxyethyl]indan.

3. A compound according to claim 1, in which the compound is 5 - [2-(N-3,3-diphenylpropylamino)-1-hydroxyethyl]indan.

No references cited.

ROBERT V. HINES, *Primary Examiner.*

U.S. Cl. X.R.

260—349, 469, 501.18, 501.19, 544, 558, 570.5, 570.6, 570.9, 592, 691, 694; 424—330